US012581241B2

(12) United States Patent
Itoh

(10) Patent No.: US 12,581,241 B2
(45) Date of Patent: Mar. 17, 2026

(54) LOUDSPEAKER

(71) Applicant: Panasonic Automotive Systems Co., Ltd., Kanagawa (JP)

(72) Inventor: Satoshi Itoh, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 135 days.

(21) Appl. No.: 18/601,417

(22) Filed: Mar. 11, 2024

(65) Prior Publication Data

US 2024/0323611 A1 Sep. 26, 2024

(30) Foreign Application Priority Data

Mar. 23, 2023 (JP) ................................ 2023-046269

(51) Int. Cl.

| | |
|---|---|
| ***H04R 7/12*** | (2006.01) |
| ***H04R 7/20*** | (2006.01) |
| ***H04R 9/02*** | (2006.01) |
| ***H04R 9/06*** | (2006.01) |

(52) U.S. Cl.
CPC ............. *H04R 7/122* (2013.01); *H04R 7/127* (2013.01); *H04R 9/025* (2013.01); *H04R 7/20* (2013.01); *H04R 9/06* (2013.01); *H04R 2231/001* (2013.01); *H04R 2307/204* (2013.01); *H04R 2307/207* (2013.01)

(58) Field of Classification Search
CPC .......... H04R 7/122; H04R 7/127; H04R 7/20; H04R 9/025; H04R 9/06; H04R 2231/001; H04R 2307/204; H04R 2307/207
See application file for complete search history.

(56) References Cited

U.S. PATENT DOCUMENTS

2015/0071481 A1* 3/2015 Little .................. H04R 31/003 381/398
2015/0350791 A1* 12/2015 Yang ........................ H04R 9/06 381/399

FOREIGN PATENT DOCUMENTS

| | | | |
|---|---|---|---|
| JP | 09-247792 | 9/1997 | |
| JP | 10-126882 | 5/1998 | |
| JP | 2003-102090 | 4/2003 | |
| JP | 2003-116195 | 4/2003 | |
| WO | WO-2013141373 A1 * | 9/2013 | ............... H04R 7/18 |

* cited by examiner

*Primary Examiner* — Sunita Joshi
(74) *Attorney, Agent, or Firm* — Greenblum & Bernstein, P.L.C.

(57) ABSTRACT

A loudspeaker includes: a diaphragm; a magnetic circuit; a frame that holds the magnetic circuit; an edge that is annular and connects the diaphragm and the frame; and a voice coil body that is disposed in a magnetic gap of the magnetic circuit. The diaphragm includes: a central portion; and an outer-circumferential portion that is provided as a single piece together with the central portion in an outer periphery of the central portion, and is bonded to the edge at a location in a vicinity of the central portion.

6 Claims, 4 Drawing Sheets

LOUDSPEAKER

CROSS REFERENCE TO RELATED APPLICATION

The present application is based on and claims priority of Japanese Patent Application No. 2023-046269 filed on Mar. 23, 2023.

FIELD

The present disclosure relates to a loudspeaker for use in various audio devices, video device, and the like.

BACKGROUND

Conventionally, although there are cases where there is a demand to achieve both full-range sound capability and high efficiency, in compact loudspeakers and the like, in some cases there is a trade-off between full-range sound capability and high efficiency. For example, in the loudspeakers described in Patent Literature (PTL) 1 and PTL 2, a brim-shaped sub diaphragm is provided so as to protrude out from a voice coil body to the front of an edge, thereby increasing the size of the vibration area and achieving high efficiency.

CITATION LIST

Patent Literature

PTL 1: Japanese Unexamined Patent Application Publication No. H10-126882

PTL 2: Japanese Unexamined Patent Application Publication No. H9-247792

SUMMARY

However, the loudspeakers described in the above-mentioned PTL 1 and PTL 2 can be improved upon.

The present disclosure provides a loudspeaker that can further improve upon the related art.

A loudspeaker according to one aspect of the present disclosure includes: a diaphragm; a magnetic circuit; a frame that holds the magnetic circuit; an edge that is annular and connects the diaphragm and the frame; and a voice coil body that is disposed in a magnetic gap of the magnetic circuit, wherein the diaphragm includes: a central portion; and an outer-circumferential portion that is provided as a single piece together with the central portion in an outer periphery of the central portion, and is bonded to the edge at a location in a vicinity of the central portion.

The loudspeaker according to the present disclosure can further improve upon the related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Hereinafter, an embodiment of a loudspeaker according to the present disclosure will be described with reference to the drawings. It should be noted that the following embodiment is merely an example for describing the present disclosure, and is not intended to limit the scope of the present disclosure. For example, the shapes, structures, materials, elements, relative positional relationships, connection states, numerical values, formulas, and details of each of the steps and the order of the steps of the methods, and the like, described in the following embodiment are mere examples, and may include details that are not included in the following description. Furthermore, although geometric expressions, such as "parallel" and "orthogonal", may be used, these expressions are not mathematically precise indications and include substantially permissible error, deviation, and the like. Moreover, expressions, such as "simultaneous" and "identical (or the same)", are considered to cover a substantially permissible range of meaning.

Additionally, the drawings are schematic illustrations, which may include emphasis, omission, or adjustment of proportion as necessary for the purpose of illustrating the present disclosure, and thus the shapes, positional relationships, and proportions shown may be different from actuality. Furthermore, an X-axis, Y-axis, and Z-axis, which may be shown in the figures, indicate orthogonal coordinates that have been set in an arbitrary manner for the purpose of describing the figures. That is to say, a Z-axis is not necessarily an axis that extends in a vertical direction, and X and Y axes do not necessarily lie within a horizontal plane.

Furthermore, hereinafter, multiple aspects may be comprehensively described as a single embodiment. Moreover, part of the contents in the description below describes optional elements related to the present disclosure.

Figure 1:
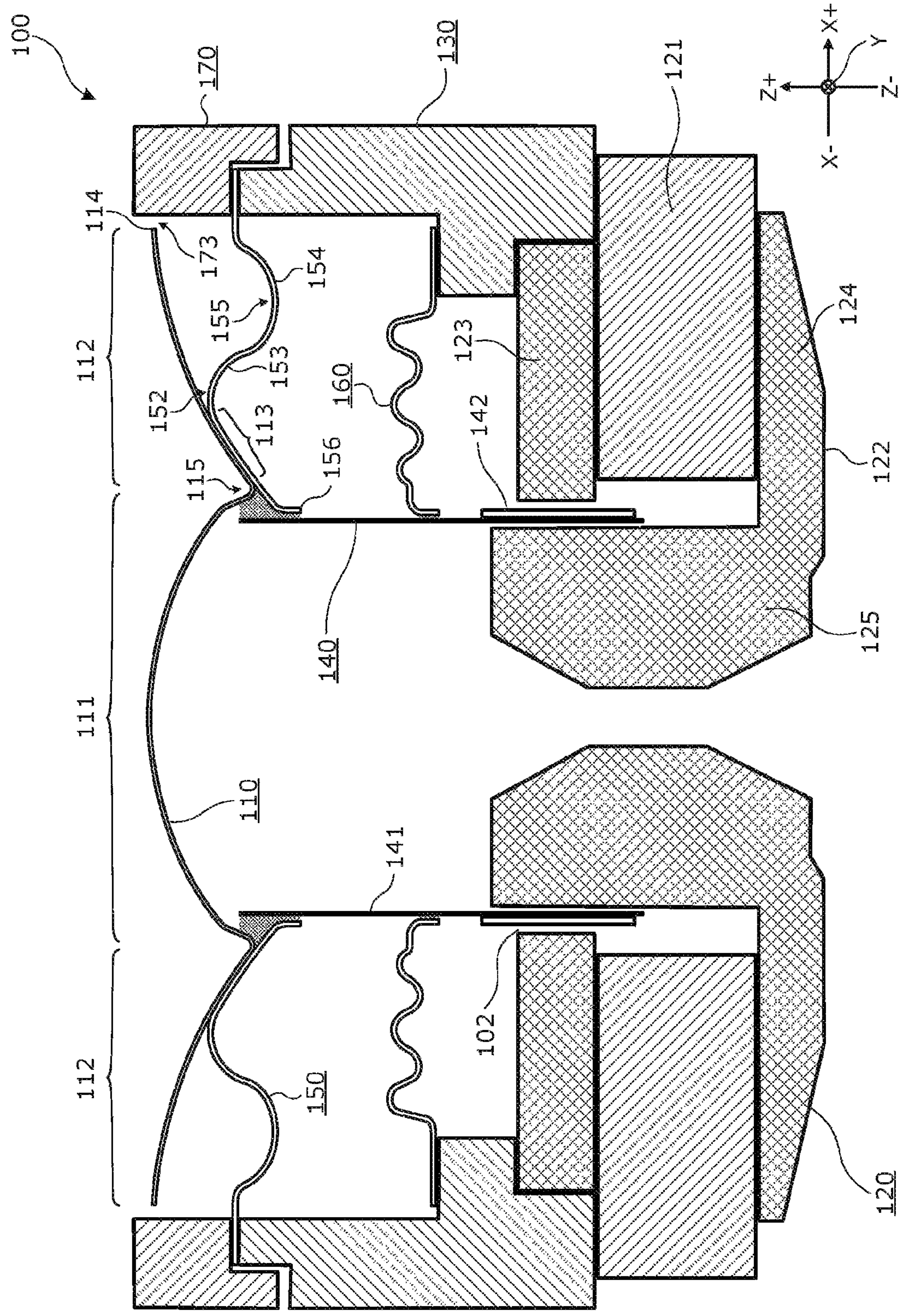
FIG. 1 is a cross-sectional view of a loudspeaker according to an embodiment of the present disclosure.
Figure 2:
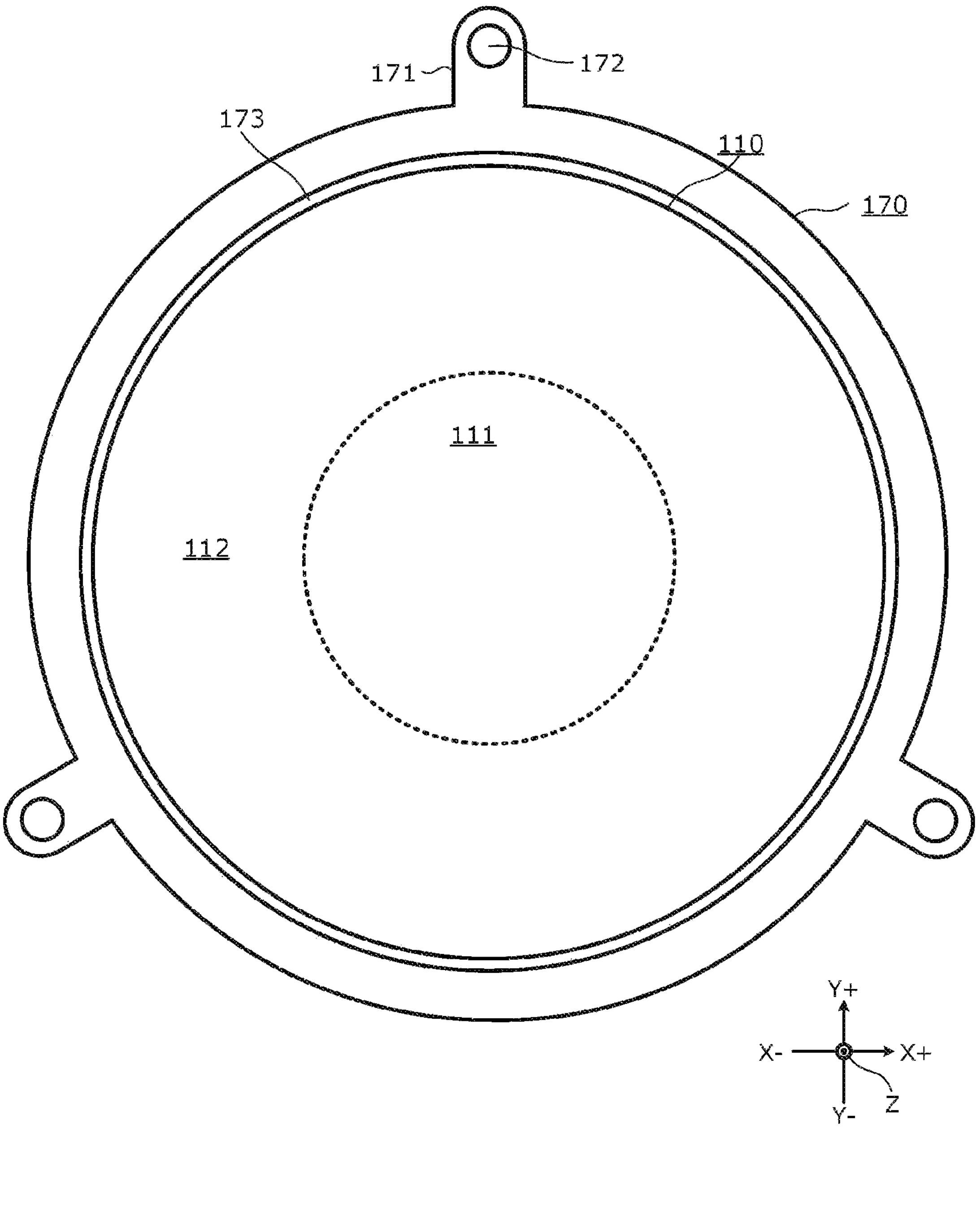
FIG. 2 is a plan view of the loudspeaker viewed from the front.

FIG. 1 is a cross-sectional view of loudspeaker 100 according to an embodiment of the present disclosure. FIG. 2 is a plan view of loudspeaker 100 viewed from the front. Loudspeaker 100 is an electroacoustic converter that converts electrical signals that are input to sound, and includes diaphragm 110, magnetic circuit 120, frame 130, and voice coil body 140. In the present embodiment, loudspeaker 100 includes cylindrical component 170 and damper 160.

Figure 3:
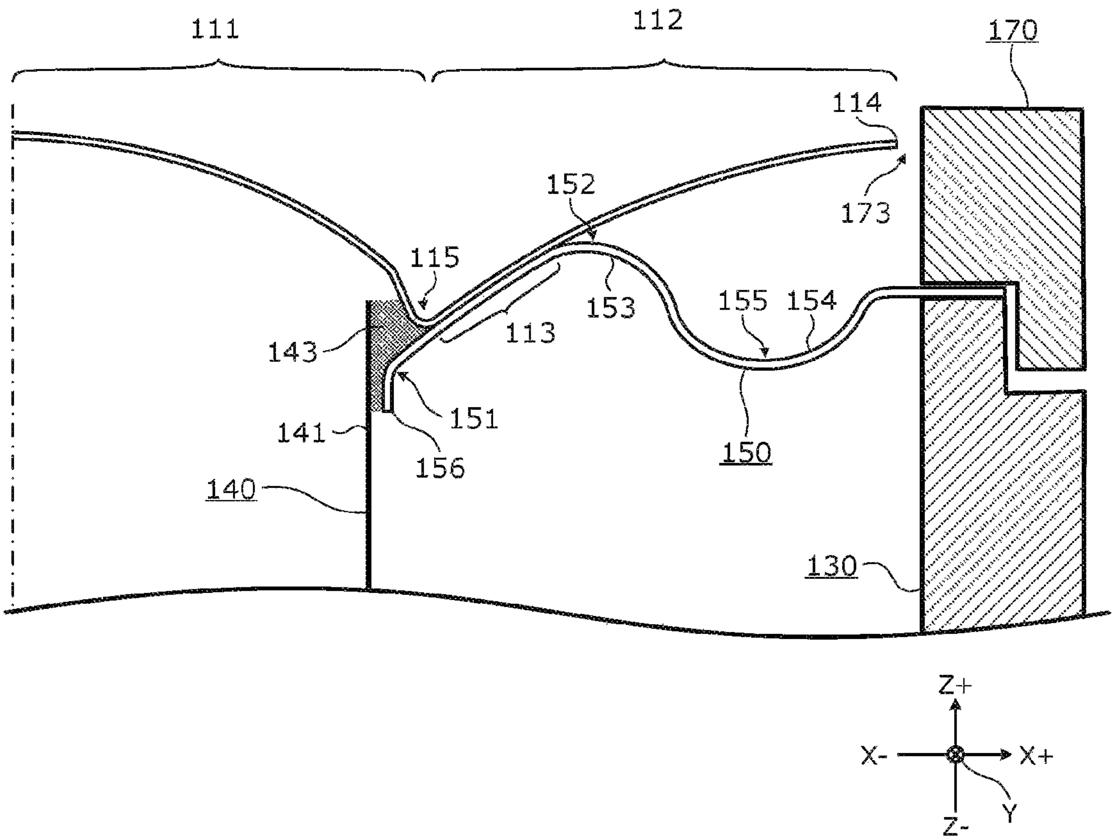
FIG. 3 is a cross-sectional view that illustrates half of a cross section of a diaphragm.

FIG. 3 is a cross-sectional view that illustrates half of a cross section of diaphragm 110. Diaphragm 110 is a board-like or membrane-like component that generates sound by vibrating in conjunction with the reciprocating motion (Z-axis direction in the figures) of voice coil body 140. Diaphragm 110 is formed as a single component made of paper, resin, metal, or the like, and includes central portion 111 and outer-circumferential portion 112 that is annular in shape and extends integrally and outward from an outer-circumferential edge of central portion 111. In the present embodiment, central portion 111 and outer-circumferential portion 112 of diaphragm 110 are formed as a single piece by press forming of a sheet-like material or a film-like material. For example, diaphragm 110 is formed by paper-making, and central portion 111 and outer-circumferential portion 112 can be formed as a single piece by conducting press forming on diaphragm 110.

In some cases, the boundary between central portion 111 and outer-circumferential portion 112 may be unclear. For example, in diaphragm 110, the annular portion that is in surface-to-surface contact with edge 150 and portions located further outside of the annular portion may be outer-circumferential portion 112, and all other portions may be central portion 111. In the present embodiment, central portion 111 is dome shaped and bulges out toward the direction of sound emission (Z+ direction in the figures), and outer-circumferential portion shaped 112 is cone (truncated-cone shaped) and expands in diameter toward the direction of sound emission. In this case, the boundary between central portion 111 and outer-circumferential portion 112 may be defined as an annular trough line that recedes toward the direction opposite of the direction of sound emission (Z− direction in the figures). It should be noted that there are cases where the boundary between central portion 111 and outer-circumferential portion 112 is a ridge line depending on the shape of diaphragm 110.

Although the shape of diaphragm 110 when seen in a plan view (when loudspeaker 100 is viewed from the direction of sound emission) is not particularly limited, in the present embodiment, the shape is circular. It should be noted that the shape of diaphragm 110 when viewed in a plan view may be elliptical, rectangular, and so on.

Magnetic circuit 120 includes magnet 121 that is a magnetized permanent magnet and yoke 122 that controls the path of magnetic field lines emitted by magnet 121, and defines annular magnetic gap 102. Magnetic circuit 120 may be of an inner-magnet type or an outer-magnet type, and the shape of magnet 121 and the shape of yoke 122 differ depending on the type. In the present embodiment, magnetic circuit 120 is of an outer-magnet type, and magnet 121 is annular in shape. Yoke 122 includes top plate 123 that is annular and located on the sound emission side of magnet 121, base plate 124 that is annular and disposed at a position so as to sandwich magnet 121 together with top plate 123, and center pole 125 that projects outward from an inner-circumferential portion of base plate 124 up to top plate 123. Top plate 123 and center pole 125 are disposed concentric to each other, and magnetic gap 102 is defined by the gap between top plate 123 and center pole 125.

Frame 130 is a structural component that holds diaphragm 110 via magnetic circuit 120 and edge 150. Although the shape of frame 130 is not particularly limited, in the present embodiment, the overall appearance of frame 130 is cylinder shaped. In the present embodiment, an end portion of frame 130 located on the sound emission side is bonded to the outer circumference of edge 150. Furthermore, an end portion of frame 130 located on an end opposite the end bonded to edge 150 is bonded to top plate 123 and magnet 121.

Voice coil body 140 is a component that moves in a reciprocating motion in the direction of sound emission, relative to magnetic circuit 120, based on acoustic signals that are inputted, thereby causing diaphragm 110 to vibrate. In the present embodiment, voice coil body 140 includes cylindrical bobbin 141 and coil 142 that is wound around the outer circumference of bobbin 141. An end portion of bobbin 141 located toward the sound emission side is bonded to the outer-circumferential edge of central portion 111 of diaphragm 110. Coil 142 is attached to an end portion of bobbin 141 located on an end opposite the end closer to the direction of sound emission, and bobbin 141 is disposed such that coil 142 is inserted into magnetic gap 102. Furthermore, bobbin 141 of voice coil body 140 is supported by annular damper 160 that connects frame 130 and voice coil body 140 in a bridge-like manner.

Edge 150 is an annular component that connects diaphragm 110 and frame 130. When an acoustic signal is not input to coil 142, edge 150 holds diaphragm 110 and voice coil body 140 in a neutral position relative to frame 130, and when an acoustic signal is input to coil 142, edge 150 expands and contracts to allow voice coil body 140 and diaphragm 110 to vibrate. There are no particular limitations on the material of edge 150. For example, edge 150 may be made of fabric, rubber, resin, or the like.

In a cross section taken along a plane that includes a winding axis of coil 142 of voice coil body 140 (surface illustrated in FIG. 1 and FIG. 3), the shape of the cross section of edge 150 is not particularly limited, and the shape may be a shape that does not include a down-roll or a shape that does not include an up-roll. In the present embodiment, edge 150 includes up-roll portion 153 in an inner-circumferential portion of edge 150, and down-roll portion 154 provided extending out from up-roll portion 153 and located outward from bonding portion 113. In the present embodiment, free end 114, which is an outer-circumferential edge of outer-circumferential portion 112 of diaphragm 110, is located outward from trough line 155 of the down-roll portion of edge 150. In other words, in the plan view, edge 150 is virtually covered by outer-circumferential portion 112 of diaphragm 110.

Edge 150 is in surface-to-surface contact and bonded to outer-circumferential portion 112 of diaphragm 110. Bonding portion 113 in which edge 150 and diaphragm 110 are bonded is located closer to central portion 111 of diaphragm 110 than free end 114 of outer-circumferential portion 112. In the present embodiment, bonding portion 113 is disposed so as to contact or nearly contact boundary 115 of central portion 111 and outer-circumferential portion 112. The length of bonding portion 113 in which outer-circumferential portion 112 and edge 150 are bonded together is at least one third of the length of distance from end portion 151, which is located toward voice coil body 140, to apex 152, in a cross section taken along a plane that includes the winding axis of coil 142 of voice coil body 140 (plane illustrated in FIG. 1 and FIG. 3). In the present embodiment, the length of bonding portion 113 is more than half of the length of distance from end portion 151 to apex 152 and approximately two thirds or more of the length of distance from end portion 151 to apex 152.

The method for bonding edge 150 and outer-circumferential portion 112 of diaphragm 110 is not particularly limited, and examples of bonding methods include a method where an adhesive is used for bonding in a planar manner and a method where thermal welding is used for bonding in a planar manner. In the present embodiment, outer-circumferential portion 112 and edge 150 are bonded by adhesive. It should be noted that the thickness of the adhesive may be thinner than the thickness of diaphragm 110. Here, "to bond in a planar manner" means that portions of outer-circumferential portion 112 and portions of edge 150 in bonding portions 113 have the same shape or practically the same shape.

Cylindrical portion 156, which is cylindrical and disposed along the outer-circumferential surface of bobbin 141, is provided in the inner-circumferential edge of edge 150, and cylindrical portion 156 and bobbin 141 are bonded to each other. The method for bonding cylindrical portion 156 and bobbin 141 is not particularly limited, and examples of bonding methods include a method where an adhesive is used for bonding and a method where thermal welding is used for bonding, for example. In the present embodiment, cylindrical portion 156 and bobbin 141 are bonded by adhesive 143. Note that in FIG. 1 and FIG. 2, there is a gap between cylindrical portion 156 and bobbin 141, and a layer of adhesive 143 that is approximately the same thickness as the thickness of cylindrical portion 156 is illustrated between cylindrical portion 156 and bobbin 141. This layer is merely presented to clearly indicate the presence of adhesive 143, and the layer of adhesive 143 may be thinner than the thickness of edge 150.

In the present embodiment, adhesive 143, which bonds bobbin 141 and cylindrical portion 156, bonds bobbin 141 to portions of edge 150 other than cylindrical portion 156, bonds bobbin 141 to the outer-circumferential edge of central portion 111 of diaphragm 110, and bonds bobbin 141 to a portion of the inner-circumferential edge of outer-circumferential portion 112 of diaphragm 110. Accordingly, bonding strength between bobbin 141, edge 150, and diaphragm 110 is enhanced.

Cylindrical component 170 is disposed surrounding diaphragm 110, while opposing frame 130 so as to flank the outer-circumferential edge of edge 150 on both sides with frame 130, and cylindrical component 170 is a component that sandwiches the outer-circumferential edge of edge 150 together with frame 130. In the present embodiment, projecting portions 171 (see FIG. 2) that project outward along a radial direction centered on the winding axis of coil 142 are provided in cylindrical component 170. Loudspeaker 100 is mounted to an enclosure of a moving body or an electronic device based on the positions of mounting holes 172 provided in the projecting portions.

In the present embodiment, cylindrical component 170 is cylindrical and follows the shape of outer-circumferential portion 112 of diaphragm 110, and gap 173 is provided between cylindrical component 170 and free end 114, which is the outer-circumferential edge of outer-circumferential portion 112 of diaphragm 110. Gap 173 is at least 1 mm or at least 3 percent of the diameter of free end 114, which is the outer-circumferential edge of outer-circumferential portion 112, in the radiating direction (radial direction) centered on the winding axis of coil 142. Accordingly, diaphragm 110 can be prevented from contacting cylindrical component 170 when diaphragm 110 is vibrating, thereby inhibiting the occurrence of frictional noise. Furthermore, a space surrounded by outer-circumferential portion 112, edge 150, and cylindrical component 170 can communicate with the outside, thus ensuring adequate air circulation to respond to changes in the volume of the space resulting from the vibration of diaphragm 110. It should be noted that, the diameter of free end 114 is the diameter of the circle represented by free end 114 when diaphragm 110 is seen in a plan view (viewing the diaphragm from the direction of sound emission).

(Conclusion)

Loudspeaker 100 according to a first aspect of the present disclosure includes: diaphragm 110; magnetic circuit 120; frame 130 that holds magnetic circuit 120; edge 150 that is annular and connects diaphragm 110 and frame 130; and voice coil body 140 that is disposed in a magnetic gap of magnetic circuit 120. Diaphragm 110 includes: central portion 111; and outer-circumferential portion 112 that is provided as a single piece together with central portion 111 in an outer periphery of central portion 111, and is bonded to edge 150 at a location in a vicinity of central portion 111.

Accordingly, by bonding outer-circumferential portion 112 of diaphragm 110 and edge 150 in bonding portion 113, the so-called free portion that stretches from bonding portion 113 to free end 114 can be reduced, thereby suppressing resonance, and, in other words, allowing resonant frequencies to be shifted to higher frequencies. Furthermore, the area of diaphragm 110 that includes central portion 111 and outer-circumferential portion 112 can be made large, thereby achieving high efficiency in loudspeaker 100.

Loudspeaker 100 according to a second aspect is loudspeaker 100 according to the first aspect, wherein outer-circumferential portion 112 is bonded to voice coil body 140.

Accordingly, bonding strength between voice coil body 140 and diaphragm 110 can be enhanced.

Loudspeaker 100 according to a third aspect is loudspeaker 100 according to the first or second aspect, wherein in a cross section taken along a plane that includes a winding axis of voice coil body 140, a length of bonding portion 113 in which outer-circumferential portion 112 and edge 150 are bonded together is at least one third of a length of a distance from an end portion of edge 150 to an apex of edge 150, the end portion being located toward voice coil body 140.

Accordingly, by ensuring that the length of bonding portion 113 is long, structural rigidity of outer-circumferential portion 112 is enhanced, thereby making it possible to prevent resonance.

Loudspeaker 100 according to a fourth aspect is loudspeaker 100 according to any one of the first to third aspects, wherein edge 150 includes: down-roll portion 154 that is located outward from bonding portion 113 that is bonded to outer-circumferential portion 112.

Accordingly, a wide margin of expansion and contraction can be ensured in edge 150. Furthermore, the distance between outer-circumferential portion 112 and down-roll portion 154 can be made large, thereby preventing outer-circumferential portion 112 and edge 150 from contacting each other when loudspeaker 100 is being driven.

Loudspeaker 100 according to a fifth aspect is loudspeaker 100 according to any one of the first to fourth aspects, wherein an outer-circumferential edge of outer-circumferential portion 112 is located outward from a trough line of down-roll portion 154 of edge 150.

Accordingly, the area of diaphragm 110 can be made large, and high efficiency can be achieved in loudspeaker 100.

Loudspeaker 100 according to a sixth aspect is loudspeaker 100 according to any one of the first to fifth aspects, and further includes: cylindrical component 170 disposed in a position surrounding diaphragm 110. A gap that is at least 1 millimeter or at least 3 percent of a diameter of outer-circumferential portion 112 in a radial direction is provided between free end 114 of outer-circumferential portion 112 and cylindrical component 170.

Accordingly, when loudspeaker 100 is being driven, contact can be avoided between diaphragm 110 and cylindrical component 170, thus allowing for adequate air circulation in the space surrounded by outer-circumferential portion 112, edge 150, and cylindrical component 170.

Loudspeaker 100 according to a seventh aspect is loudspeaker 100 according to any one of the first to sixth aspects, wherein central portion 111 of diaphragm 110 and outer-circumferential portion 112 of diaphragm 110 are provided as a single piece by press forming of a sheet-like material or a film-like material. Furthermore, loudspeaker 100 according to an eighth aspect is loudspeaker 100 according to any one of the first to seventh aspects, wherein edge 150 consists essentially of fabric, rubber, or resin.

Accordingly, outer-circumferential portion 112 of diaphragm 110 and edge 150 can be effectively bonded together.

Figure 4:
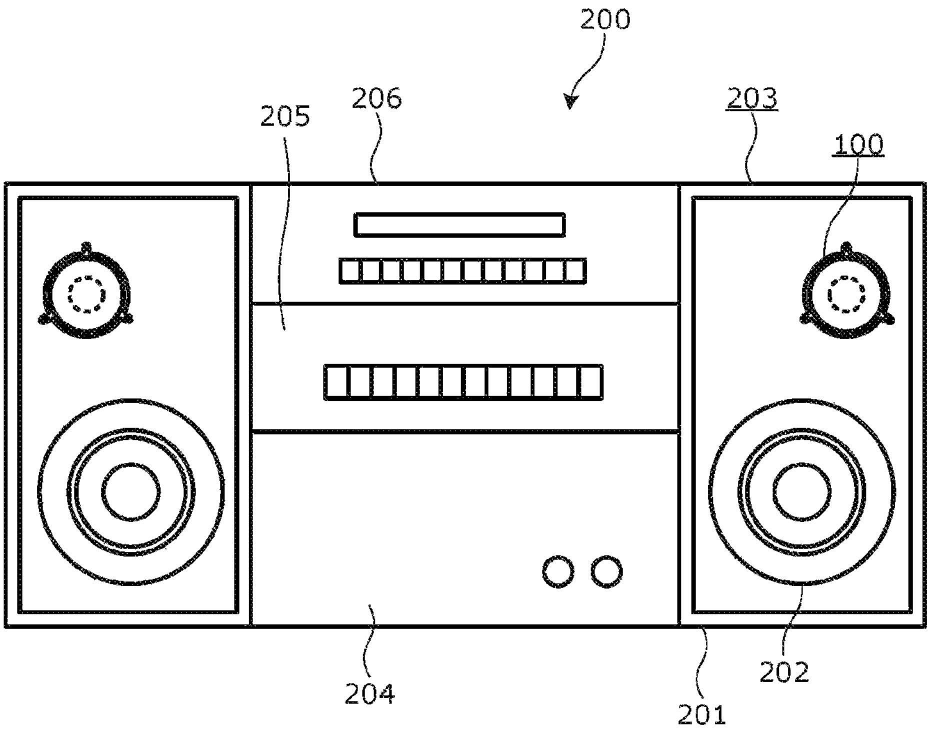
FIG. 4 is a figure illustrating an appearance of an electronic device that is Application Example 1 of the loudspeaker.

Next, Application Example 1 of loudspeaker 100 will be described. FIG. 4 is a figure illustrating an appearance of an electronic device that is Application Example 1 of loudspeaker 100. An audio mini-component system will be described as an example of electronic device 200 that includes loudspeaker 100.

Electronic device 200 includes, on the left and right, loudspeaker systems 203 each composed of loudspeaker 100 and subwoofer 202, which are housed in enclosure 201.

Furthermore, electronic device 200 includes amplifier 204 that includes an amplifying circuit for acoustic signals input to loudspeaker systems 203, and tuner 205 and CD player 206 that output a source to be input to amplifier 204.

In electronic device 200, which is an audio mini-component system, acoustic signals, or the like, input from tuner 205 and CD player 206 are amplified by amplifier 204, and sound is emitted from loudspeakers 100 and subwoofers 202 provided in loudspeaker systems 203. Specifically, in loudspeaker 100, the interaction between the dynamic magnetic force generated by the acoustic signal input to voice coil body 140 and the static magnetic force generated in magnetic gap 102 of magnetic circuit 120 causes voice coil body 140 to vibrate in relation to frame 130. This vibration is transmitted and causes diaphragm 110 to vibrate and thereby generate sound.

As described earlier, with this configuration, it is possible to realize electronic device 200, which can maintain favorable audio quality and favorable characteristics in a manner that was not conventionally possible.

While an audio mini-component system was described as an application example of loudspeaker 100 to electronic device 200, applications are not limited to such an example. For example, loudspeaker 100 can be applied for use in audio systems in automobiles and in portable audio devices, and the like. Furthermore, loudspeaker 100 can be widely applied and deployed for use in video equipment, such as liquid crystal display (LCD) televisions and organic electroluminescence (EL) display televisions, and the like, information communication devices, such as mobile phones, and the like, and electronic devices, such as computer related devices, and the like.

Figure 5:
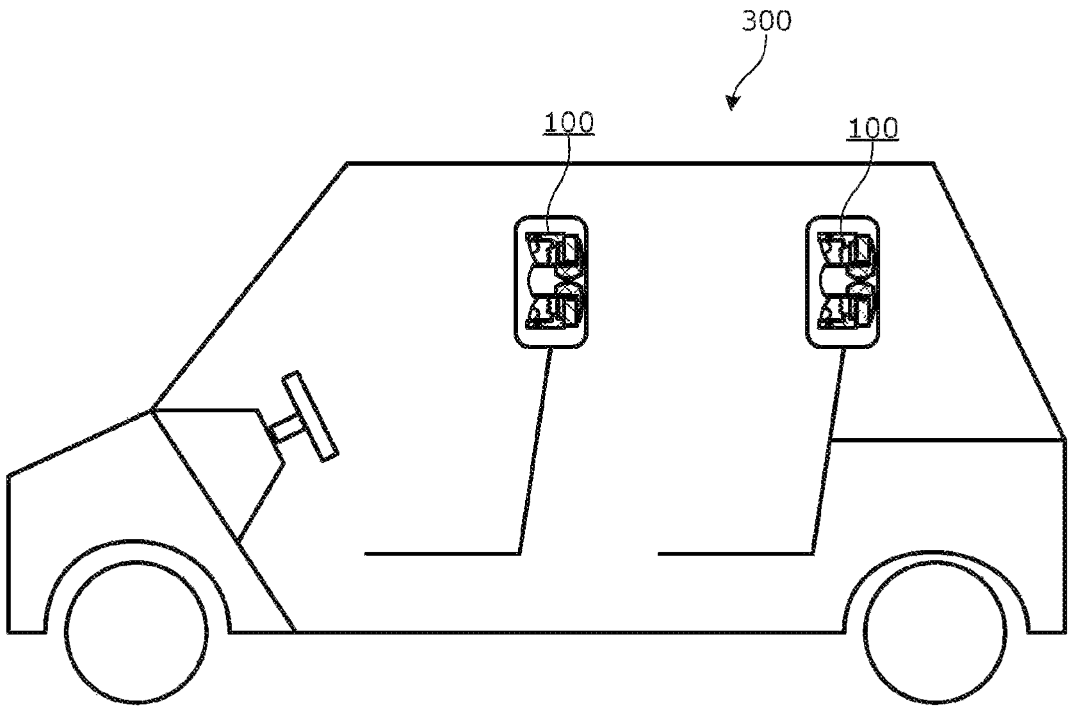
FIG. 5 is a cross-sectional view of a moving body that is Application Example 2 of the loudspeaker.

Next, Application Example 2 of loudspeaker 100 will be described. FIG. 5 is a cross-sectional view of moving body 300 that is Application Example 2 of loudspeaker 100. In the present embodiment, an automobile is described as an example of moving body 300.

As illustrated in this figure, loudspeaker 100 according to the present disclosure is provided in the head rest, rear tray, front panel, pillar, or the like of moving body 300. Loudspeaker 100 emits sound inside of moving body 300 based on acoustic signals transmitted from a car navigation or car audio unit that is separately provided in moving body 300.

In this manner, even when loudspeaker 100 attached to moving body 300 is a compact loudspeaker attached to a head rest or the like, loudspeaker 100 is capable of achieving both full-range sound capability and high efficiency.

It should be noted that the present disclosure is not limited to the above embodiment. For example, other embodiments produced by arbitrarily combining or omitting some elements described in the present Description may be included as embodiments of the present disclosure. Moreover, the present disclosure includes variations obtained by various modifications to the above embodiment that can be conceived by those skilled in the art, so long as they do not depart from the essence of the present disclosure, that is, the intended meaning of the appended Claims.

For example, loudspeaker 100 need not include damper 160.

Moreover, voice coil body 140 may include coil 142 without including a bobbin.

While an embodiment has been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims is incorporated herein by reference in its entirety: Japanese Patent Application No. 2023-046269 filed on Mar. 23, 2023.

INDUSTRIAL APPLICABILITY

Loudspeaker 100 according to the present disclosure is applicable to electronic devices, such as audio-visual devices and information communication devices, and the like, and moving bodies, such as automobiles, and the like.

The invention claimed is:

1. A loudspeaker comprising:
- a diaphragm;
- a magnetic circuit;
- a frame that holds the magnetic circuit;
- an edge that is annular and connects the diaphragm and the frame; and
- a voice coil body that is disposed in a magnetic gap of the magnetic circuit, wherein
- the diaphragm includes:
  - a central portion; and
  - an outer-circumferential portion that is provided as a single piece together with the central portion in an outer periphery of the central portion, and is bonded to the edge at a location in a vicinity of the central portion,
- the edge includes:
  - a down-roll portion that is located outward from a bonding portion that is bonded to the outer-circumferential portion, and
- an outer-circumferential edge of the outer-circumferential portion is located outward from a trough line of the down-roll portion of the edge.

2. The loudspeaker according to claim 1, wherein
- the outer-circumferential portion is bonded to the voice coil body.

3. The loudspeaker according to claim 1, wherein
- in a cross section taken along a plane that includes a winding axis of the voice coil body, a length of a bonding portion in which the outer-circumferential portion and the edge are bonded together is at least one third of a length of a distance from an end portion of the edge to an apex of the edge, the end portion being located toward the voice coil body.

4. The loudspeaker according to claim 1, further comprising:
- a cylindrical component disposed in a position surrounding the diaphragm, wherein
- a gap that is at least 1 millimeter or at least 3 percent of a diameter of the outer-circumferential portion in a radial direction is provided between an outer-circumferential edge of the outer-circumferential portion and the cylindrical component.

5. The loudspeaker according to claim 1, wherein the central portion of the diaphragm and the outer-circumferential portion of the diaphragm are provided as a single piece by press forming of a sheet-like material or a film-like material.

6. The loudspeaker according to claim 1, wherein the edge consists essentially of fabric, rubber, or resin.

* * * * *